(12) United States Patent
Benjamin

(10) Patent No.: US 12,250,236 B2
(45) Date of Patent: Mar. 11, 2025

(54) COLLECTING ENDPOINT DATA AND NETWORK DATA TO DETECT AN ANOMALY

(71) Applicant: Level 3 Communications, LLC, Broomfield, CO (US)

(72) Inventor: Michael Benjamin, Broomfield, CO (US)

(73) Assignee: Level 3 Communications, LLC, Denver, CO (US)

( * ) Notice: Subject to any disclaimer, the term of this patent is extended or adjusted under 35 U.S.C. 154(b) by 289 days.

(21) Appl. No.: 17/664,920

(22) Filed: May 25, 2022

(65) Prior Publication Data

US 2023/0051880 A1  Feb. 16, 2023

Related U.S. Application Data

(60) Provisional application No. 63/231,346, filed on Aug. 10, 2021.

(51) Int. Cl.
*H04L 9/40* (2022.01)

(52) U.S. Cl.
CPC ...... *H04L 63/1425* (2013.01); *H04L 63/0227* (2013.01); *H04L 63/1433* (2013.01)

(58) Field of Classification Search
CPC .......... H04L 63/1425; H04L 63/0227; H04L 63/1433; H04L 63/145; H04L 63/1491
USPC .......................................................... 726/23
See application file for complete search history.

(56) References Cited

U.S. PATENT DOCUMENTS

| | | | | |
|---|---|---|---|---|
| 8,528,086 | B1 * | 9/2013 | Aziz | H04L 63/145 713/193 |
| 11,057,414 | B1 * | 7/2021 | Giorgio | H04L 63/1416 |
| 11,469,946 | B2 * | 10/2022 | Srinivas | H04L 41/145 |
| 11,640,470 | B1 * | 5/2023 | Amar | G06Q 10/0635 726/22 |
| 11,700,190 | B2 * | 7/2023 | Yadav | H04L 63/1433 718/1 |
| 11,824,646 | B1 * | 11/2023 | Muddu | H04L 41/22 |
| 2003/0005145 | A1 * | 1/2003 | Bullard | H04L 43/026 709/224 |
| 2017/0250855 | A1 * | 8/2017 | Patil | H04L 41/147 |
| 2019/0238584 | A1 * | 8/2019 | Somasundaram | H04L 63/20 |
| 2019/0378119 | A1 * | 12/2019 | Hyuga | G06Q 20/065 |
| 2020/0412549 | A1 * | 12/2020 | Endo | H04L 9/0643 |
| 2022/0027465 | A1 * | 1/2022 | Hercock | G06F 21/554 |

* cited by examiner

*Primary Examiner* — Badri Narayanan Champakesan

(57) ABSTRACT

The present application describes a system that uses endpoint data and network data to detect an anomaly. Once an anomaly is detected, the system may determine a severity of the anomaly by comparing the anomaly to a global database of known anomalies. The system may then initiate preventative measures to address the anomaly.

16 Claims, 6 Drawing Sheets

COLLECTING ENDPOINT DATA AND NETWORK DATA TO DETECT AN ANOMALY

CROSS-REFERENCE TO RELATED APPLICATIONS

This application claims the benefit of U.S. Provisional Application No. 63/231,346 filed 10 Aug. 2021, entitled "Collecting Endpoint Data and Network Data to Detect an Anomaly," which is incorporated herein by reference in its entirety.

BACKGROUND

In data security, the more information that is available to detect or otherwise identify a potential malicious attack, the better. For example, as more information is collected, a type of malicious attack, as well as a remedy for the malicious attack, may be more readily identified.

SUMMARY

The present application describes a system that uses various sources of data to detect and identify computer-based threats and other malicious activity. For example, the system described herein receives endpoint data from a computing device. The endpoint data may include data corresponding to various activities the computing device participated in. The system may also receive network data associated with the computing device. The network data may include domain name system (DNS) lookups requested by the computing device, a list of websites that the computing device visited, an address resolution protocol (ARP) communication associated with the computing device, and so on.

Once the endpoint data and the network data is collected, the data is stitched together or otherwise combined to generate event data. Using the event data, the system described herein can analyze a sequence of events at the network level and the host level to proactively detect an anomaly and/or retroactively identify an anomaly.

Once the anomaly is detected, the anomaly may be compared against a global database of anomalies to identify details about the anomaly. The details may include whether the anomaly is specific to the particular computing device or entity associated with the computing device, whether the anomaly has been detected before, or whether the anomaly or similar anomalies are associated with known bad actors.

The system may also generate a user interface for display. The user interface may include a timeline with selectable elements, each of which are associated with various events identified by the event data. Selection of the selectable elements provides additional details about each event.

Accordingly, the present application describes a method comprising receiving endpoint data from a computing device and receiving network data from a network access device. In an example, the network data is associated with the computing device. The endpoint data and the network data are combined to generate event data associated with the computing device. The event data includes a sequence of events between the computing device and the network access device. The event data associated with the computing device is analyzed to detect an anomaly. Based on detecting the anomaly, a mitigation procedure to address the anomaly is initialized.

Also described is a system, including a processor and a memory coupled to the processor. The memory stores instructions that, when executed by the processor, perform operations. In an example, the operations include receiving endpoint data from a computing device and receiving network data from a network access device. The network data is associated with the computing device. The endpoint data and the network data are combined to generate event data associated with the computing device. In an example, the event data includes a sequence of events between the computing device and the network access device. The event data associated with the computing device is analyzed to detect an anomaly. Based on detecting the anomaly, the anomaly may be categorized. A mitigation procedure to address the anomaly may then be initiated.

The present application also describes a method, comprising receiving endpoint data from a first computing device and receiving network data associated with the first computing device. Event data for the first computing device is generated based, at least in part, on the endpoint data and the network data. The event data is analyzed in order to identify an anomaly in the event data and a mitigation procedure is initiated.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
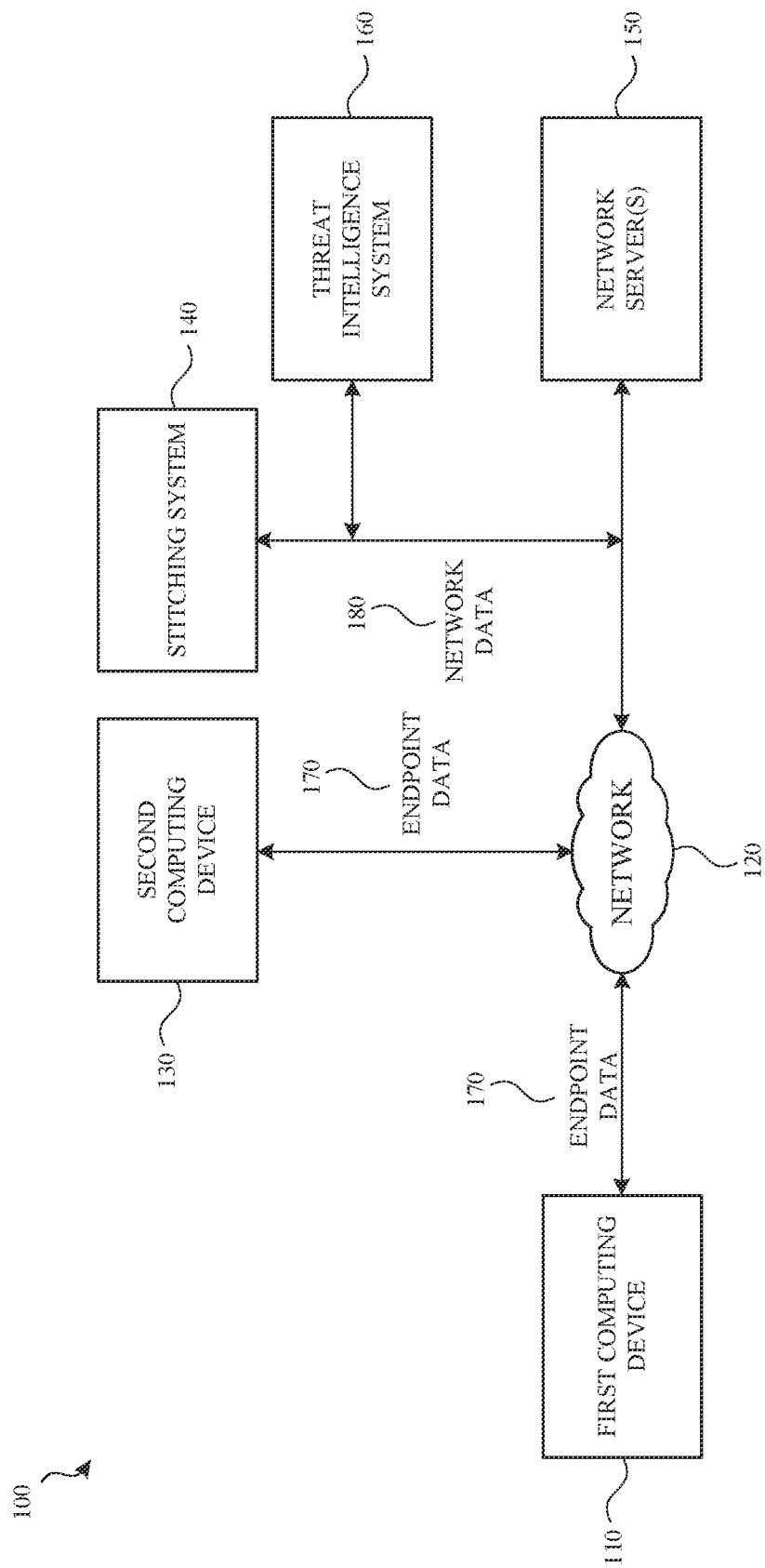
FIG. 1A illustrates an example system for using endpoint data and network data to detect an anomaly according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Endpoint detection and response (EDR) software is typically installed on a computing device. The EDR software monitors various activities of the computing device, collects data corresponding to the activities and provides the data to an analysis system. The analysis system analyzes the data in order to identify a known or suspected chain of events or other information that represents potentially malicious software.

For example, the EDR software may collect data that indicates that a computing device running a particular operating system executed (or is executing) a script out of a spreadsheet application. The script causes another application to be downloaded and subsequently executed. This is a common way for malware to spread but it is not a common way for a spreadsheet application to function. Accordingly, the EDR software may detect or otherwise determine the presence of malware based on the above-described chain of events.

EDR software typically only tracks events that occur on the computing device. However, there may be other information, such as network data, that can be used to gain more information about a potential threat and/or a detected anomaly. For example, prior to executing the script in the example above, the computing device may have communicated with other computing devices via a network connection. Data may have been transferred between the computing devices and the script and/or the application that was downloaded, may have originated from that data transfer. Using a combination of network data and endpoint data, the system of the present disclosure creates a more comprehensive view of actions and/or events associated with a particular computing device when an anomaly is detected than is available in current EDR implementations.

Accordingly, the present application describes a system that uses a combination of endpoint data and network data to detect and identify computer-based threats and other malicious activity. For example, the system described herein receives endpoint data from a computing device and also receives network data associated with the computing device. Once the data is collected, event data is generated. The event data is analyzed to detect a sequence of events that may be used to identify an anomaly.

Once an anomaly is detected, the anomaly is compared against a global database of anomalies to identify details about the anomaly. The details may include whether the anomaly is specific to the computing device, whether the anomaly has been detected with respect to different computing devices and/or whether the anomaly or similar anomalies are associated with known bad actors. When an anomaly is detected and exhibits similar behaviors to anomalies associated with known bad actors, the anomaly may be categorized accordingly. In another example, an anomaly may be categorized based on a determined severity of the anomaly.

When an anomaly is detected, the system may generate and provide a user interface for display on the computing device or another computing device. The user interface may include a timeline with selectable elements. The selectable elements may be associated with various events identified by the event data. Selection of the selectable elements provides additional details about each event.

These and other examples will be described in more detail with respect to FIG. 1-FIG. 4.

FIG. 1A illustrates an example system 100 for using endpoint data 170 and network data 180 to detect an anomaly according to an example. As shown in FIG. 1A, the system 100 may include a first computing device 110 and a second computing device 130. The first computing device 110 may access one or more network servers 150 via a network 120. The network 120 may include one or more network access devices such as, for example, gateways, switches, routers or other network access devices. Likewise, the second computing device 130 may access the one or more network servers 150 via the network 120. Although the first computing device 110 and the second computing device 130 are shown connecting to the same network 120, the first computing device 110 and the second computing device 120 may access different networks.

In an example, the first computing device 110 and the second computing device 130 may include software and/or systems that collect endpoint data 170. The endpoint data 170 may include information about various activities and/or events that occurred on the computing device. For example, the endpoint data 170 may describe how a particular application is executing (or has executed) on the first computing device 110. In another example, the endpoint data 170 may include file system logs, performance metrics, file details and/or configuration data. Although specific information is received, the endpoint data 170 may include other types of information that may be useful in detecting and/or identifying potential threats.

In an example, the endpoint data 170 is collected by the first computing device 110 in real-time or substantially real-time. In another example, the endpoint data 170 is collected in response to the detection of an anomaly or threat (e.g., by a threat intelligence system 160). In yet another example, the endpoint data 170 may be provided to a stitching system 140 via the network in real-time, substantially real-time or periodically. The endpoint data 170 may also be provided to the stitching system 140 in response to an event (e.g., a detected anomaly).

In addition to collecting endpoint data 170, the system 100 also captures or otherwise collects network data 180. The network data 180 may include information about interactions between the first computing device 110 (or the second computing device 130) and the network servers 150 and/or interactions between the first computing device 110 and the second computing device 130 or other computing devices.

For example, the network data 180 may include various types of internet level data and ethernet level data. Examples include, protocol level information, HTTP requests, email information (e.g., who was an email sent from/to), packet information associated with an email, navigation information (e.g., what website the first computing device 110 visited), MAC addresses associated with and/or accessed by the first computing device 110, domain name system (DNS) lookups associated with the first computing device 110, an address resolution protocol (ARP) communications associated with the first computing device 110, information relating to layer two broadcasts and so on. The network data 180 may be collected in real-time, substantially real-time or periodically. In another example, the network data 180 may be collected in response to an event (e.g., a detected threat or anomaly). In examples, network data 180 is distinct from endpoint data 170 and includes only information available for events occurring outside of the first computing device 110 or second computing device 130, as applicable. In other examples, some network data 180 may include information that is also included in endpoint data 170.

As indicated above, the system 100 may also include a stitching system 140. The stitching system 140 may be communicatively coupled to the first computing device 110 and/or the second computing device 130 via the network 120. The stitching system 140 may also be communicatively coupled to the network servers 150.

The stitching system 140 may receive the endpoint data 170 and the network data 180. For example, the stitching system 140 may receive the endpoint data 170 from the first computing device 110 and/or the second computing device 130. Likewise, the stitching system 140 may receive the network data 180 from a network server 150 or from a network access device associated with the first computing device 110.

The stitching system 140 may receive the endpoint data 170 and/or the network data 180 automatically. For example, the stitching system 140 may continuously or periodically receive endpoint data 170 as the endpoint data 170 is collected or otherwise received by the first computing device 110. Likewise, the stitching system 140 may receive the network data 180 from a network access device associated with the first computing device 110 and/or the network servers 150.

In another example, the stitching system 140 may receive the endpoint data 170 and/or the network data 180 in response to an identified anomaly or threat. For example, the system 100 may include a threat intelligence system 160 that monitors network data 180 and/or endpoint data 170 to identify potential threats. In another example, the threat intelligence system 160 may detect or otherwise be made aware of a current or ongoing threat. In either example, the threat intelligence system 160 may cause the stitching system 140 to request or otherwise receive the endpoint data 170 and/or the network data 180.

Figure 1B:
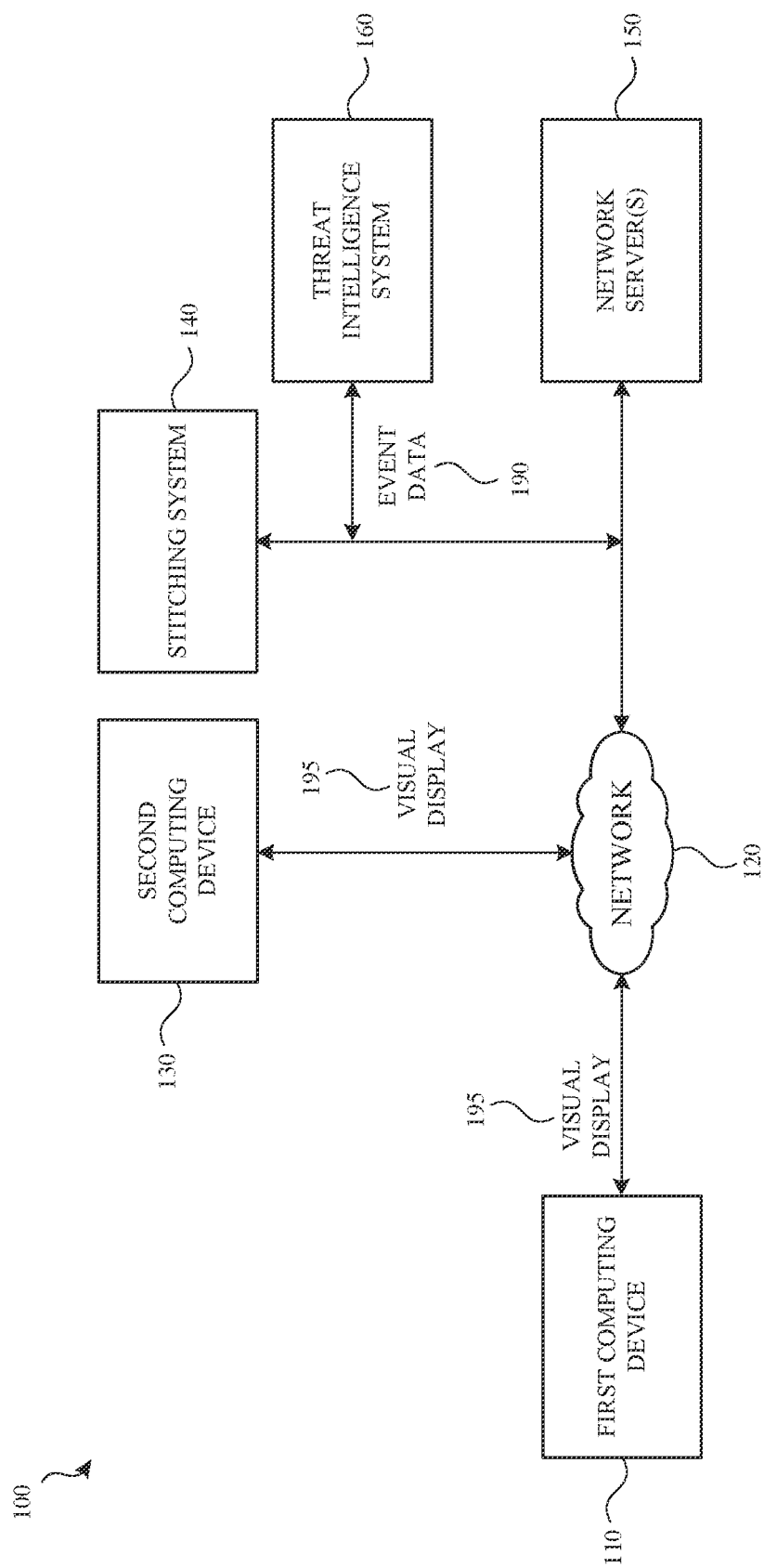
FIG. 1B illustrates the example system of FIG. 1A in which a visual display that provides information about the anomaly is provided to a computing device according to an example.

When the stitching system 140 receives the endpoint data 170 and the network data 180, the stitching system 140 combines the endpoint data 170 with the network data 180 to generate event data 190 (FIG. 1B). The event data 190 includes an end-to-end view of a sequence of events that occurred between the first computing 110 (or the second computing device 130) and the network servers 150. For example, the event data 190 may include information corresponding to DNS lookups that occurred, websites that were visited, ARP or other layer two broadcasts that occurred, files that were accessed and/or installed on the computing device, what those files did on the computing device and so on.

Once the event data 190 is created, the event data 190 is analyzed by the stitching system 140 to detect an anomaly or known malicious behavior. Because the event data 190 includes the endpoint data 170 and the network data 180, detection of an anomaly, and the effects/severity of the anomaly, may be better determined when compared with current solutions in which only endpoint data is collected and analyzed.

For example, because the stitching system 140 has access to the network data 180 and the endpoint data 170, the stitching system 140 may map an entire sequence of events across the first computing device 110 and the network servers 150 to create a holistic view of a sequence of events. In an example, anomalies in the event data 190 may be detected by the stitching system 140. When an anomaly is detected, the anomaly, and associated event data 190 may be provided to the threat intelligence system 160.

In another example, the stitching system 140 may provide the event data 190 to the threat intelligence system 160 prior to the detection of an anomaly. Although the threat intelligence system 160 is shown as being separate from the stitching system 140, the threat intelligence system 160 may be integrated or otherwise associated with the stitching system 140.

In examples in which the threat intelligence system 160 receives the event data 190 (e.g., either before or after the detection of an anomaly), the threat intelligence system 160 compares the event data to another known or anomaly or other malicious behavior in order to determine additional information about the anomaly and/or to categorize the anomaly. For example, the threat intelligence system 160 may compare the anomaly to other global network events and host events from a geographic area (e.g., a geographic area associated with the first computing device 110 and/or the second computing device 130) or from a number of different geographic areas (e.g., across a global network).

As part of this analysis, the threat intelligence system 160 may tag or otherwise identify various details about the anomaly. These details may be used to categorize the anomaly and may include whether the first computing device 110 and/or an entity (e.g., a business) associated with the first computing device 110 was a target of the anomaly, whether the anomaly has been seen before, what mitigation techniques and/or preventative measures were taken to address the anomaly, whether the anomaly is associated with a known bad actor and/or malware campaign and so on.

In some examples, the threat intelligence system 160 may utilize intelligence derived from automated honeynets, global NetFlow based visibility and/or automated threat validation such as described in U.S. Pat. No. 10,320,629 and U.S. patent application Ser. No. 16/845,799, each of which are incorporated by reference herein in their entirety.

In an example, the analysis performed by the threat intelligence system 160 may detect an initial event (thereby causing the stitching system 140 to request and/or otherwise receive the endpoint data 170 and/or the network data 180) and/or to identify associated threats. In another example and such as described above, the threat intelligence system 160 may receive the event data 190 once the stitching system 140 has detected an anomaly from the endpoint data 170, the network data 180 or a combination of the endpoint data 170 and the network data 180.

As shown in FIG. 1B, when a threat or anomaly is detected, the stitching system 140 may generate a visual display 195. The visual display 195 may be provided to the first computing device 110 and/or the second computing device 130 (or a different device). The visual display 195 may include information about the anomaly and/or any associated threats. For example, the visual display 195 may include information about the malware campaign that is associated with the anomaly, how the anomaly was detected, bad actors/entities that are known or suspected to be associated with the anomaly or malware campaign and so on.

The visual display 195 may also show each event in the sequence of events in a timeline based format (or other visual format) such as shown and described with respect to FIG. 4 (discussed further below). In this example, each event may include or otherwise be associated with a selectable element. Selection of the selectable element may cause the visual display 195 to display an interlinked visualization of the information included in the endpoint data 170 and the network data 180. Additionally, the timeline may include a selectable element associated with the anomaly or other detected malicious behavior. As the selectable elements are selected, the additional information about the event may be displayed. For example, the additional information may include information associated with where the anomaly was detected (e.g., locally and/or globally) or where the anomaly originated from.

The visual display 195 may also enable a network technician or other individual to write and/or apply one or more scripts to the anomaly. In an example, the script may be used to initiate or perform one or more blocking operations, mitigation techniques and/or other preventative measures in order to address the anomaly. In another example, the preventative measure(s) may be automatically initiated by an artificial intelligence system and/or a machine learning system in response to the detection and/or identification of an anomaly. In such an example, the artificial intelligence system may learn which preventative measures to implement based on a comparison between the detected anomaly and the global list of known anomalies (and how those anomalies were addressed). For example, a machine learning system may analyze collected data in order to identify patterns and actions that are associated with and/or are similar to known attacker behavior and anomalies. Once the patterns and actions are identified, previous efforts to mitigate the attacks may be determined and applied for the current identified anomaly.

Figure 2:
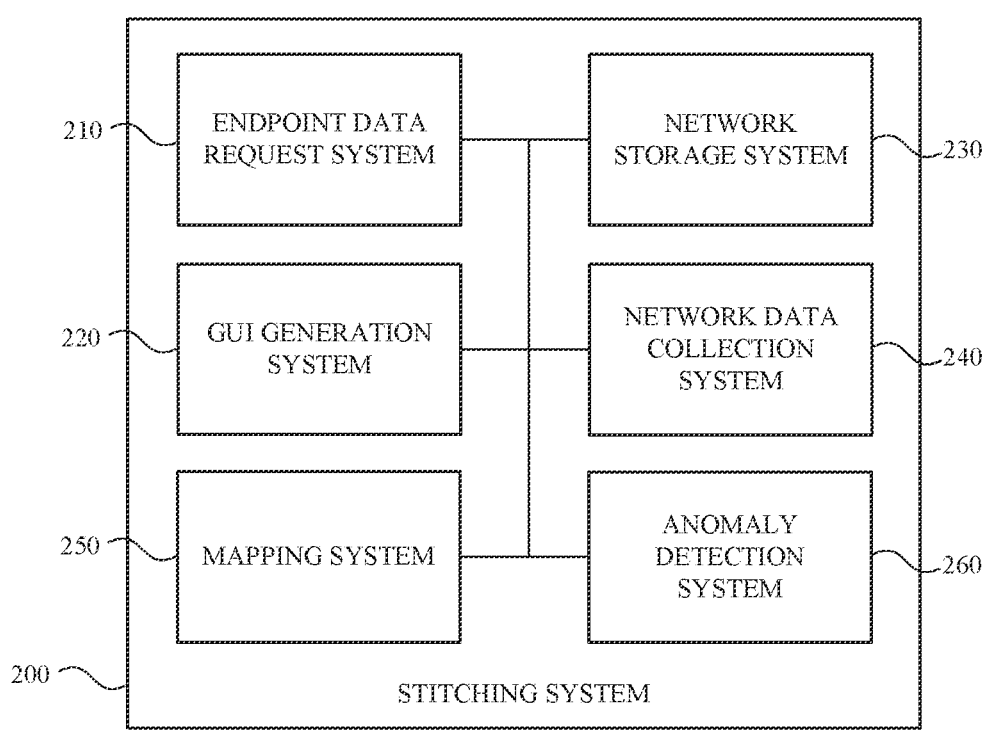
FIG. 2 illustrates an example stitching system that may be used to combine endpoint data and network data according to an example.

FIG. 2 illustrates an example stitching system 200 that may be used to combine endpoint data and network data according to an example. In an example, the stitching system 200 may be similar to the stitching system 140 shown and described with respect to FIG. 1A and FIG. 1B.

As shown in FIG. 2, the stitching system 200 includes an endpoint data request system 210, a GUI generation system 220, a network storage system 230 a network data collection system 240, a mapping system 250 and an anomaly detection system 260. Although various systems are shown and described, the stitching system 200 may include various other systems. For example, the stitching system 200 may include a threat intelligence system. In another example, the stitching system 200, or various systems of the stitching system 200, may be integrated or otherwise associated with a threat intelligence system. In yet another example, one or more systems of the stitching system 200 may be included in or otherwise associated with a computing device.

The endpoint data request system 210 may be responsible for requesting and/or receiving endpoint data (e.g., endpoint data 170 (FIG. 1A)) from a computing device. In an example, the endpoint data request system 210 may request and/or receive endpoint data continuously or periodically. For example, the endpoint data request system 210 may request that the computing device send collected endpoint data every five minutes, every ten minutes, every hour, etc. In another example, the endpoint data request system 210 may request endpoint data from a computing device in response to the anomaly detection system 260 and/or a threat intelligence system detecting an anomaly.

For example, if the threat intelligence system detects an anomaly associated with network data that originates from or is sent to the computing device, the endpoint data request system 210 may request endpoint data from the computing device. In another example, endpoint detection and response software executing on the computing device may detect an anomaly or other malicious behavior on the computing device and report the anomaly to the anomaly detection system 260. As part of this process, the computing device may provide the endpoint data to the endpoint data request system 210. When the endpoint data is received, the endpoint data may be stored by the network storage system 230.

The stitching system 200 also receives network data (e.g., network data 180 (FIG. 1A)). The network data may be received and/or requested by the network data collection system 240. In an example, the network data collection system 240 may be associated with a network service provider that provides network services to the computing device. In some examples, the network data may be collected by the network data collection system 240 continuously or periodically. As the network data is received, the network data may be stored by the network storage system 230.

In another example, the network data collection system 240 may collect the network data in response to the detection of an anomaly or other event. In yet another example, the network data collection system 240 may provide collected network data to a requesting computing device. For example, the network data collection system 240 may provide network data to a requesting computing device in response to endpoint detection and response software executing on the computing device detecting an anomaly.

The stitching system 200 may also include a mapping system 250. The mapping system 250 may use the received endpoint data and the received network data to generate event data. For example, the mapping system 250 may determine how the various events and other information in the network data and the endpoint data relate. In an example, the event data is stored in or is otherwise associated with a graph database.

The mapping system 250 may also handle received queries associated with an anomaly when the anomaly is detected by the anomaly detection system 260. For example, when an anomaly in the event data is detected by the anomaly detection system 260, the mapping system 250 may receive a query that requests all information that originated or is otherwise associated with a particular IP address during a particular time period. In another example, the mapping system 250 may receive a request for information about every computing device that interacted with a particular uniform resource locator during a particular time frame, what those computing devices did across the network, and what behaviors did the computing devices exhibit after the interactions. Although specific requests have been given, these are for example purposes only. As queries are received, the graph database may be traversed to acquire the requested information.

The requested information may be provided to the GUI generation system 220. The GUI generation system 220 may then provide a visual display to a computing device. An example visual display is shown and described with respect to FIG. 4.

The anomaly detection system 260 may implement one or more machine learning systems to generate and update various models. The models may be used to detect or otherwise identify anomalies and/or potentially malicious behavior. For example, through the collection of endpoint data and network data, and by monitoring similar behavior across the network and known attacker behavior, the anomaly detection system 260 may continuously learn to recognize anomalies and malicious behavior.

In an example, the anomaly detection system 260 may provide information about a detected anomaly to a threat intelligence system such as previously described. For example, when an anomaly is detected, the anomaly detection system 260 may compare the anomaly (or may provide the anomaly to a threat intelligence system to enable the threat intelligence system to compare the anomaly) to a broader corpus of anomaly information to determine characteristics about the anomaly. The anomaly detection system 260 may determine a severity of the anomaly—is the anomaly targeting secure data (e.g., secure/confidential information) or insecure data (e.g., an internal news page for an organization). The anomaly detection system 260 may also determine whether the anomaly been detected in another geographic area and/or whether the anomaly exhibits the same or similar behavior to known malicious actors or entities.

The anomaly detection system 260 may also determine and/or provide information about how to initiate preventative measures for the anomaly. In an example, the preventative measures may be provided to the GUI generation system 220 which enables the preventative measures to be provided in the visual display.

Figure 3:
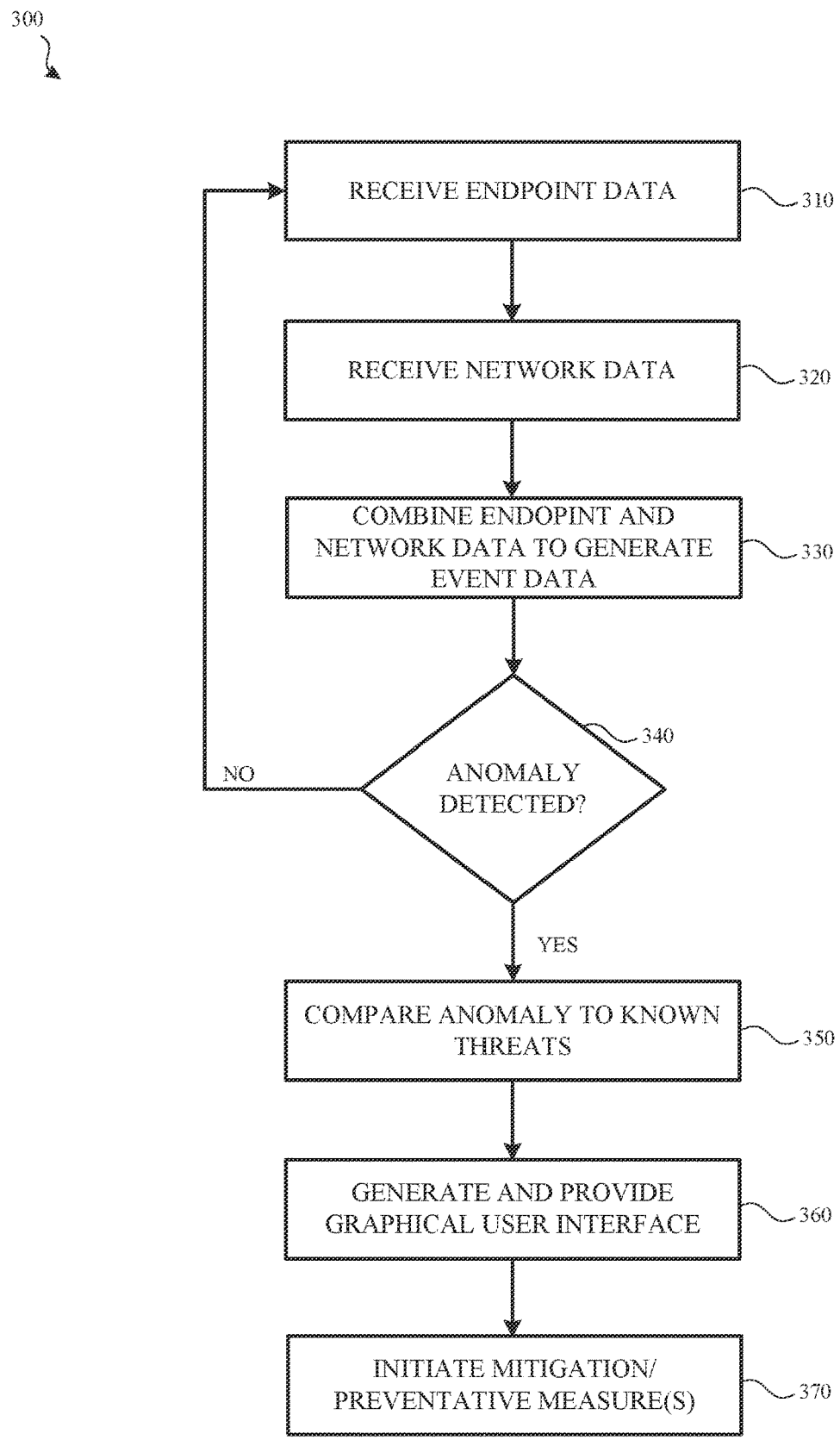
FIG. 3 illustrates a method for detecting an anomaly according to an example.

FIG. 3 illustrates a method 300 for detecting an anomaly according to an example. The method 300 may be implemented by one or more systems shown and described with respect to FIG. 1A-FIG. 2.

The method 300 begins when endpoint data is received (310). In an example, endpoint data may be received, by a stitching system, from a computing device. The endpoint data may be received in response to an event (e.g., a detected anomaly) or periodically. The endpoint data may include information on actions taken by the computing device. In another example, the endpoint data may include information about data interactions of the computing device. For example, the endpoint data may include information about file interactions, applications that are loaded and/or executed by the computing device, etc.

In addition to receiving endpoint data, the system may also receive (320) network data. The network data may include information about interactions between the computing device and one or more network access devices. The network access devices may include gateways, routers, switches and servers. The network data may also include interactions between the computing device and other remote computing devices. For example, the network data may include communications between the computing devices, files that are shared between the computing devices and so on.

When the network data and the endpoint data is received, the network data and the endpoint data is combined (330) to generate event data. In an example, the network data and the endpoint data is combined based on associated and/or related endpoint actions and network actions. For example, endpoint data, such as a URL that is entered in a web browser may be tagged and associated with an IP address (e.g., network data) that the URL is associated with. Upon accessing the IP address, the computing device may download a file (e.g., network data). Once the file has been downloaded, the endpoint data may indicate that the computing device installed or otherwise accessed the file. In an example, all of the information described above is stored and associated in a graph database.

Once the event data is generated, the event data (or portions of the event data) is analyzed to determine whether an anomaly is detected (340). In an example, an anomaly may be detected by mapping or observing suspicious behavior and/or comparing current behavior to known suspicious behavior. In an example, the anomaly may be detected using machine learning or other artificial intelligence systems that use models to detect and/or identify known, new and/or emerging threats. In some examples, the anomaly may be detected using the endpoint data, the network data or a combination of the endpoint data and the network data. If an anomaly is not detected, the system may continue to receive (310) endpoint data and/or receive (320) network data.

However, if an anomaly is detected, the system compares (350) the anomaly to known threats. In an example, the anomaly is provided to a threat intelligence system that analyzes the anomaly against a global database of known threats. In an example, the anomaly detection system and/or the threat intelligence system may be associated with a network service provider that has access to the global database of known threats.

Details about the anomaly may be tagged or otherwise flagged. Some of this information may include a severity of the anomaly, whether the anomaly has been seen in other geographic areas, a number of times the anomaly has been detected, whether the anomaly is similar to other anomalies associated with known bad actors/entities, etc.

Once information about the anomaly is identified, a graphical user interface is generated (360) and provided to a computing device. The graphical user interface may include a timeline with selectable events associated with the anomaly. Selection of a selectable event causes the display to provide additional information about the event. For example, one selectable event may indicate that the computing device accessed a server associated with a particular IP address. Selection of this selectable element may provide information about a time at which the computing device accessed the server, files or other information that was provided to/from the server, IP addresses of other computing devices that accessed that same server during a particular timeframe and so on. An example user interface is described below with respect to FIG. 4.

The graphical user interface may also include information regarding one or more preventative or mitigation measures that may be taken to remedy the anomaly. For example, the graphical user interface may enable an individual to write and/or initiate (370) a script that blocks the anomaly. In another example, when an anomaly is detected, the system may automatically initiate a block or perform some other mitigation technique.

Figure 4:
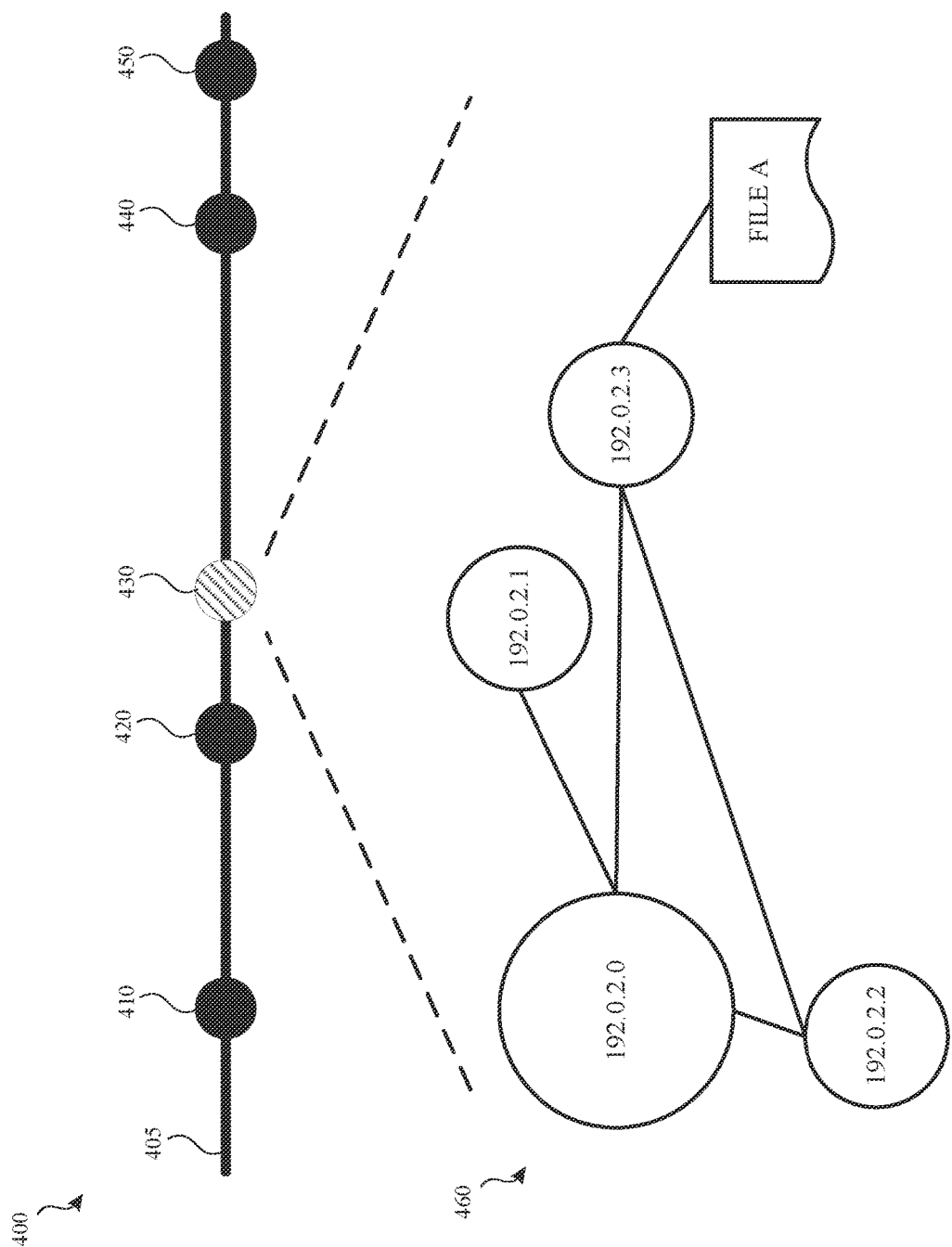
FIG. 4 illustrates a user interface that may be generated in response to a detection of an anomaly according to an example.

FIG. 4 illustrates a user interface 400 that may be generated in response to a detection of an anomaly according to an example. The user interface 400 may be provided to a computing device such as described above.

In an example, the user interface 400 may include timeline 405. The timeline 405 may include various events identified from received endpoint data and received network data. In the example shown in FIG. 4, events detected or otherwise associated with endpoint data are represented by the solid circles 410, 420, 440 and 450 while events detected or otherwise associated with network data are represented by the patterned circle 420.

For example, when an anomaly is detected, the timeline 405 may indicate that at a particular time associated with event 410, a user entered a particular URL in a browser of the computing device. At event 420, the endpoint data indicates the computing device accessed the URL. At event 430, the network data may indicate that the URL delivered a particular file or payload to the computing device. At event 440, the endpoint data may indicate that the computing device stored the received file in a file system. At event 450, the endpoint data may provide information indicating that the user doubled clicked on the file.

In an example, each event may be selectable. Upon selection of an event, additional information about the event is provided on the user interface 400. In the example shown in FIG. 4, the user has selected event 430. In response to the selection, the user interface 400 displays additional information 460 about the event 430.

Continuing with the example above, the additional information 460 may indicate that the computing device, is located or otherwise associated with IP address 192.0.2.0. The additional information 460 may also indicate that the computing device accessed a computing device or server located at or otherwise associated with IP address 192.0.2.3. The computing device then accessed a file named "File A".

As also shown, the additional information 460 may include other IP addresses the computing device interacted with and/or other computing devices that may have accessed File A. These include a computing device located at or otherwise associated with IP address 192.0.2.2 and a computing device located at or otherwise associated with IP address 192.0.2.1. In an example, the computing devices associated with these IP addresses may be part of or otherwise associated with the same entity.

In response to receiving or otherwise viewing the additional information 460, a user may initiate preventative and/or mitigation measures against File A. The preventative and/or mitigation measures may be applied to a single computing device (e.g., the computing device associated with IP address 192.0.2.0) or with multiple computing devices (e.g., the computing devices associated with IP address 192.0.2.0, IP address 192.0.2.2 and IP address 192.0.2.1).

Figure 5:
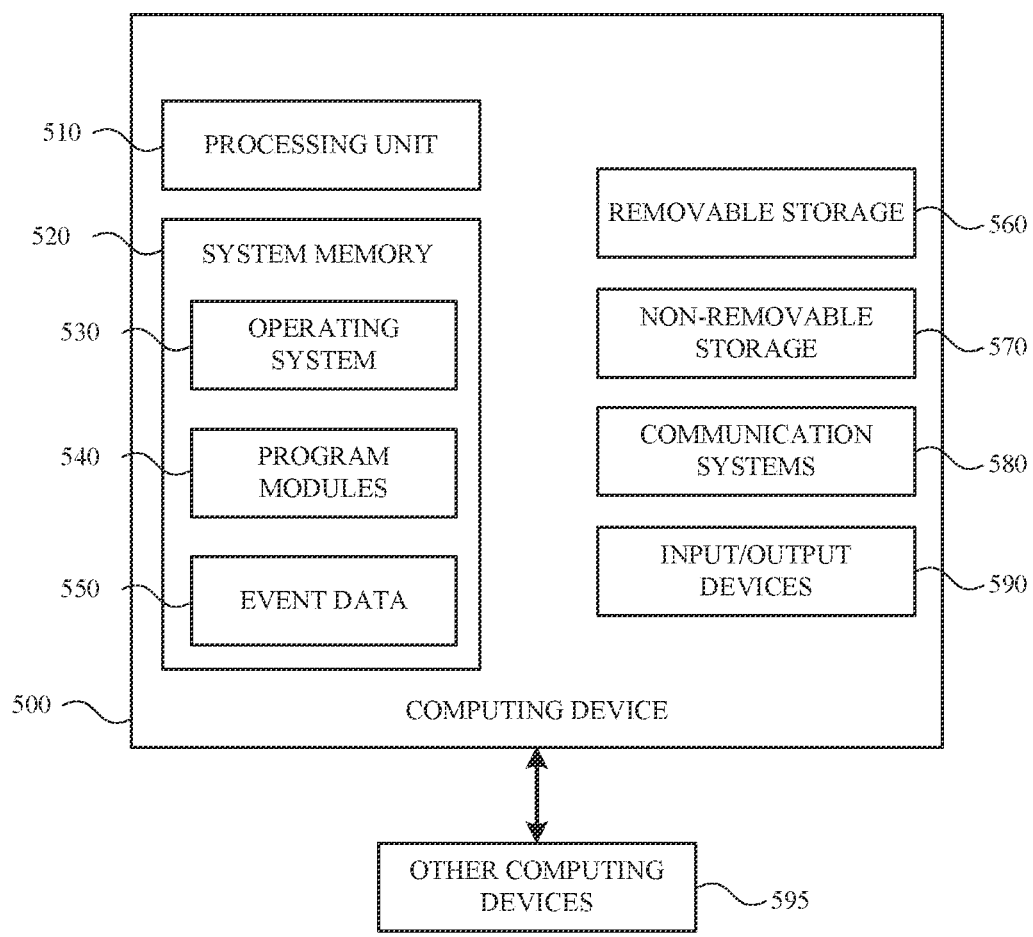
FIG. 5 is a block diagram of a computing device according to one or more examples.

FIG. 5 is a system diagram of a computing device 500 according to an example. The computing device 500, or various components and systems of the computing device 500, may be integrated or associated with a threat intelligence system, a network server, and/or a stitching system. As shown in FIG. 5, the physical components (e.g., hardware) of the computing device are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for gathering or determining event data 550 including endpoint data and/or network data. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
receiving endpoint data of a computing device from the computing device, the endpoint data comprising activities and/or events that occurred on the computing device;
receiving network data from a network access device, the network data being associated with the computing device;
combining the endpoint data and the network data to generate event data associated with the computing device, the event data including a sequence of events between the computing device and the network access device;
analyzing the event data associated with the computing device to detect an anomaly; and
initiating a mitigation procedure to address the anomaly.

2. The method of claim 1, further comprising:
generating a timeline of the event data; and
causing the timeline to be provided on a display of a remote computing device.

3. The method of claim 2, wherein at least a portion of the timeline is selectable.

4. The method of claim 3, further comprising providing additional information associated with the timeline in response to receiving a selection of the at least the portion of the timeline.

5. The method of claim 1, wherein the mitigation procedure includes causing a blocking action to be performed on the anomaly.

6. The method of claim 1, wherein the endpoint data is endpoint detection and response (EDR) data.

7. A system, comprising:
a processor; and
a memory coupled to the processor and storing instructions that, when executed by the processor, perform operations, comprising:
receiving endpoint data of a computing device from the computing device, the endpoint data comprising activities and/or events that occurred on the computing device;
receiving network data from a network access device, the network data being associated with the computing device;
combining the endpoint data and the network data to generate event data associated with the computing device, the event data including a sequence of events between the computing device and the network access device;
analyzing the event data associated with the computing device to detect an anomaly;
categorizing the anomaly based, at least in part, on the analyzing; and
initiating a mitigation procedure to address the anomaly.

8. The system of claim 7, further comprising instructions for:
generating a timeline of the event data; and
causing the timeline to be provided on a display of a remote computing device.

9. The system of claim 8, wherein at least a portion of the timeline is selectable.

10. The system of claim 9, further comprising instructions for providing additional information associated with the timeline in response to receiving a selection of the at least the portion of the timeline.

11. The system of claim 7, wherein the mitigation procedure includes an initiating of a blocking action performed on the anomaly based, at least in part, on the categorization of the anomaly.

12. The system of claim 7, wherein the endpoint data is endpoint detection and response (EDR) data.

13. A method, comprising:
receiving endpoint data of a first computing device from the first computing device, the endpoint data comprising activities and/or events that occurred on the first computing device;
receiving network data associated with the first computing device;
generating event data for the first computing device based, at least in part, on the endpoint data and the network data;
analyzing the event data;
identifying an anomaly in the event data; and
initiating a mitigation procedure on the anomaly.

14. The method of claim 13, wherein the mitigation procedure is a blocking procedure.

15. The method of claim 13, wherein the network data includes one or more of a domain name system (DNS) lookup associated with the first computing device, a website that was visited by the first computing device, or an address resolution protocol (ARP) communication associated with the first computing device.

16. The method of claim 13, further comprising generating a timeline for display on a user interface, the timeline including one or more selectable events associated with the event data.

* * * * *